(12) United States Patent
Chen et al.

(10) Patent No.: US 6,977,915 B2
(45) Date of Patent: Dec. 20, 2005

(54) METHOD AND SYSTEM FOR CONTROLLING DEVICE TRANSMIT POWER IN A WIRELESS COMMUNICATION NETWORK

(75) Inventors: Xixian Chen, Nepean (CA); Neil N. McGowan, Stittsville (CA); Weigang Li, Nepean (CA); Jeffrey D. Stanier, Ottawa (CA); M. Khaled Islam, Nepean (CA); Qiang Shen, San Diego, CA (US); Xin Jin, Nepean (CA)

(73) Assignee: Nortel Networks Limited, St. Laurent (CA)

(*) Notice: Subject to any disclaimer, the term of this patent is extended or adjusted under 35 U.S.C. 154(b) by 950 days.

(21) Appl. No.: 09/772,622

(22) Filed: Jan. 30, 2001

(65) Prior Publication Data

US 2002/0101832 A1 Aug. 1, 2002

(51) Int. Cl.[7] ............................................. H04B 7/216
(52) U.S. Cl. .................. 370/335; 370/342; 375/144; 375/148; 455/522
(58) Field of Search ............................. 370/311, 318, 370/335, 342, 479; 375/144, 148; 455/522

(56) References Cited

U.S. PATENT DOCUMENTS

| | | | |
|---|---|---|---|
| 5,870,393 A | 2/1999 | Yano et al. | 370/335 |
| 6,539,008 B1 * | 3/2003 | Ahn et al. | 370/342 |
| 6,633,553 B1 * | 10/2003 | Hwang | 370/329 |
| 6,717,976 B1 * | 4/2004 | Shen | 375/147 |

FOREIGN PATENT DOCUMENTS

| | | | | |
|---|---|---|---|---|
| WO | WO 00/48327 | 8/2000 | ............ | H04B/1/66 |
| WO | WO 00/57654 | 9/2000 | ............ | H04Q/7/00 |
| WO | WO 00/60763 | 10/2000 | ............ | H04B/7/005 |
| WO | WO 01/01601 A1 | 1/2001 | ............ | H04B/7/005 |

OTHER PUBLICATIONS

T-C Song, P. van Rooyen and X. Xia, "*Comparative Study of Power Control Techniques for Cellular CDMA,*" web site URL: http://www.ee.up.ac.za/ee/telecoms/telecentre/TCS-Satnac.html, 13 pages, downloaded Nov. 28, 2000.

Z. Han, "*Technical Research Report,*" Study of DS-CDMA, RAKE Receiver and Proposal for a Multicarrier DS-CDMA System, web site URL: http://www.isr.umd.edu/CSHCN/, Jul. 1999.

"*3G Glossary & Terms,*"web site URL:http://www.3gonline.com/3ginteractive/glossary.htm, 17 pages, downloaded Nov. 28, 2000.

* cited by examiner

*Primary Examiner*—Chi Pham
*Assistant Examiner*—Rhonda Murphy
(74) *Attorney, Agent, or Firm*—Borden Ladner Gervais LLP; Dennis R. Haszko

(57) ABSTRACT

A method and system for closed loop power control in a wireless communication network. A received signal is despread. The signal power of the despread received signal is estimated. The noise power of the despread received signal is estimated. Estimating the noise power includes multiplying the despread received signal with an orthogonal noise code to cancel the received signal, accumulating the multiplied despread received signal over one frame and determining a signal-to-noise ratio of the received signal at least in part by dividing the estimated signal power by the estimated noise power. A reverse power control bit is determined based on the determined signal-to-noise ratio.

34 Claims, 7 Drawing Sheets

METHOD AND SYSTEM FOR CONTROLLING DEVICE TRANSMIT POWER IN A WIRELESS COMMUNICATION NETWORK

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a method and system for closed loop transmit power control in a wireless communication network, and in particular, to a method for determining the signal to noise ratio in a wireless communication channel by estimating the signal power and the noise power to establish a transmit power control bit used to control the transmitter of a mobile device.

BACKGROUND OF THE INVENTION

CDMA (code division multiple access) is a wireless communication technique which employs spread-spectrum single-sideband technology. Commercial implementations of CDMA technology typically take the form of a digital cellular phone and/or data communication service in which a code is assigned to all speech or user data bits, scrambled transmission of the encoded speech is wirelessly transmitted and the speech (or data) reassembled to its original format upon delivery to the receiver.

In a CDMA system, each device is given a unique sequence, called a pseudo-random code. This sequence identifies the device. For example, if device A has sequence-A and device B has sequence-B, a receiver receiving data from device-A uses sequence-A to decode the wanted information. The receiver receives the energy (power) being transmitted by device-A and disregards the energy transmitted by device-B. Because device-A and device-B are isolated by having different codes, they can share the same carrier frequency, partially eliminating the frequency reuse problem encountered by previous cellular communication technologies.

CDMA is an interference-limited system. Although it has a soft capacity limit, each device is a noise source on the shared channel and the noise contributed by devices accumulates. This creates a practical limit to how many devices the system will sustain. Mobile devices which transmit excessive power increase interference to other mobile devices. For CDMA, precise power control of mobile devices is important in maximizing the system's capacity and increasing the battery life of the devices. The goal is to keep each device at the absolute minimum power level required to ensure acceptable service quality.

Thus, in CDMA mobile device-based systems, closed loop power control is employed to maintain acceptable service quality for all mobile station receivers at the base station. To accomplish this power control, the receiver typically performs an estimation of the received signal and noise power levels, determines a signal to noise ratio (SNR) and compares the SNR with an SNR threshold. If the received SNR is less than the threshold, a power-up command, typically in the form of a single bit, is embedded in the forward link and transmitted from the base station to the mobile device, requesting an increase in transmit power. Otherwise, a power-down command is sent to the mobile device to lower its transmit power.

This power control command is embedded in the forward CDMA channel in the form of reverse link power control bits. In general, reverse link power control methods are known. For example, reverse link power control bits are implemented in some cases in pseudo-random positions in each 1.25 ms interval which employs power control (power control group or PCG), or 16 times per frame in standards which employ power control such as the Air Interface Standard IS-95 and the CDMA2000 standard. Each power control bit is interpreted as a command to raise or lower power by a predetermined increment. Each base station makes power control decisions independently for each mobile device. The mobile device demodulates the power control bits and raises or lowers its transmit power accordingly. As stated above, the goal of power control is to maintain the reverse channel (mobile devices to base station) transmit power at the lowest possible level to achieve a given error rate performance.

One approach common to CDMA systems is the use of a Rake receiver for combining information obtained from several resolvable multi-path components in order to combine an enhanced signal with a high voice/data quality. The Rake receiver includes a bank of correlators, also referred to as demodulators, each of which correlate to a particular multi-path component of the desired signal. The correlator outputs, commonly referred to as the Rake channels or fingers, may be rated according to their relative strengths and summed to obtain a final signal estimate.

Obviously, it is important to accurately obtain an estimation of the received SNR for proper power control. In the current implementation of the Air Interface Standard IS-95 reverse channel, there is only one channel per user link. The reverse channel uses 64-ary orthogonal modulation symbols, specifically Walsh functions of order 64. The SNR estimation is performed by processing the Walsh spectrum of the Rake output. There are 64 elements in the orthogonal demodulation output of the Rake receiver. By regarding the largest element as the signal contribution and the rest as being caused by noise and interference, one can obtain an SNR estimation at the Rake receiver output. In the CDMA2000 Air Interface Standard, each user has a continuous pilot channel which can be used for SNR estimation and up to four reverse sub-channels, each having different rates and power levels. It is therefore important to be able to accurately measure the received signal power level and received noise level in order to accurately determine the SNR for subsequent power control bit determination.

Further, standards such as the CDMA2000 Air Interface Standard provide for supplemental channels which are sometimes used and sometimes not used. This can lead to inaccurate measurement of the total channel power, particularly in the case of estimating the noise power level. It is therefore desirable to have a method which provides for an accurate and reliable noise power level determination, regardless of whether supplemental channels are employed.

Accurate estimation becomes even more important when dealing with wireless high speed data communication (e.g. 100 Kbits/second and faster). Conventional methods for estimating the received noise power include measuring the total energy received by the base station. As such, the estimated noise power is based on both the signal energy and noise energy. These methods do not provide sufficient accuracy when the mobile device signal includes high speed data. Conventional methods for estimating the pilot signal energy include despreading the received signal and coherently accumulating the despreaded received signal over a certain interval, for example, 384 chips, and then non-coherently accumulating over one power control group. However, the phase disturbances due to channel fading may degrade estimation accuracy. As such, selecting a power control group referenced to the user frame as the interval selected for estimation of signal power may not be close enough to the position of the reverse power control bit embedded in the forward CDMA channel to provide an accurate estimate. This is the case because the delay from the time the signal power is estimated to the time the power control bit is embedded in the transmit signal may be so great as to not accurately represent a change in the quality of the channel. This can result from movement of the mobile device and/or the surroundings.

As such, it is desirable to reduce the power control delay in a manner such that the selected interval for estimating the signal power is as close as possible to the position of the reverse power control bit to maximize the accuracy of the power control bit determination. It is further desirable to have a method for estimating the received signal energy which employs a correlation process which significantly reduces the phase disturbance due to fading.

Conventional methods use one complete power control group signal to estimate signal power. If the wireless device is far from the base station, the base station may not be able to send the power control bit on the forward link in the next PCG because the base station may not be able to complete processing in a manner which provides enough time to insert and transmit the power control bit in the outbound power control group position. As such, in accordance with known standards, the power control bit must be inserted in the second power control group following the corresponding reverse link power control group in which the signal power was estimated. These conventional methods provide for the possible distance differences between wireless devices and their corresponding base stations by incorporating undesirable delay. It is desirable to have an arrangement which allows the power control bit determination to be made as temporally close to the point at which the power control bit must be inserted as possible.

SUMMARY OF THE INVENTION

The present invention advantageously provides a method and system for closed loop power control in a wireless system. The present invention provides a method and system which allows the noise level of a received signal to be quickly and accurately estimated and provides a method and system by which the signal power level can be quickly and accurately measured while still complying with known wireless communication standards. The present invention implements these power estimation methods in a manner which advantageously allows a reduction in power control delay by selecting a signal interval for estimation as close as possible to the position of the reverse power control bit imbedded in the forward link.

According to one aspect, a method for closed loop power control in a wireless communication network is provided in which a received signal is despread. The signal power of the despread received signal is estimated. The noise power of the despread received signal is also estimated. Noise power estimation includes multiplying the despread received signal with an orthogonal noise code to cancel the received signal and accumulating the multiplied despread received signal over one frame. A signal-to-noise ratio of the received signal is determined at least in part by dividing the estimated signal power by the estimated noise power. A reverse power control is determined bit based on the determined signal-to-noise ratio.

According to another aspect, a method for estimating a power level for a despread wireless communication signal having a non-gated pilot signal is provided, the despread received signal being arranged as a plurality of Rake fingers, in which a forward power control bit is obtained by decoding the despread received signal. For each of the plurality of Rake fingers:

the decoded forward power control bit is multiplied with at least one forward power control bit portion;

the position of the reverse power control bit is determined;

the despread received signal of the corresponding Rake finger is selected for a duration of one power control group;

the received despread signal is accumulated to eliminate all data channel signals except a pilot signal to create a decimated pilot signal;

the decimated pilot signal is multiplied with a complex conjugate of a delayed version of the decimated pilot signal to obtain a multiplied result; and a real component of the multiplied result is accumulated over one power control group to obtain a Rake finger output. The signal power estimate is determined by coherently combining and averaging the plurality of Rake finger outputs.

According to yet another aspect, a method for estimating a power level for a despread wireless communication signal having a gated pilot signal is provided, the despread received signal being arranged as a plurality of Rake fingers, in which, for each of the plurality of Rake fingers: the despread received signal is coherently accumulated and a squared amplitude is taken over a time of the coherent accumulation to determine a finger signal power level within one-half of a power control group. The finger signal power levels for all of the plurality of Rake fingers is summed together over one-half of the power control group to determine an intermediate signal power estimate. The intermediate signal power estimate is added to a previous signal power estimate.

According to still yet another aspect, the present invention provides a system for closed loop power control in a wireless communication network, in which a communication unit has a receiver and a central processing unit. The receiver receives a first signal. The central processing unit is in operative communication with the receiver and executes functions including: despreading the received first signal, estimating the signal power of the despread received first signal, estimating the noise power of the despread received first signal, determining a signal-to-noise ratio of the received first signal at least in part by dividing the estimated signal power by the estimated noise power and determining a reverse power control bit based on the determined signal-to-noise ratio. Estimating the noise power includes multiplying the despread received signal with an orthogonal noise code to cancel the received first signal and accumulating the multiplied despread received first signal over one frame.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Initially, it is noted that the term "data" as used herein refers generally to the content being transported from one location, device, element, etc., to another, regardless of form. For example, "data" as used herein can include voice content as well as non-voice content and device location information, and can include overhead data such as packetizing information, headers, error checking codes, etc. Specific types of data or packet components such as pilot signals are noted as such herein, where appropriate.

The term "mobile device" as used herein includes wireless devices and wired devices which are readily capable of moving from location to location such as a laptop personal computer, personal digital assistant (PDA) and the like.

Figure 1:
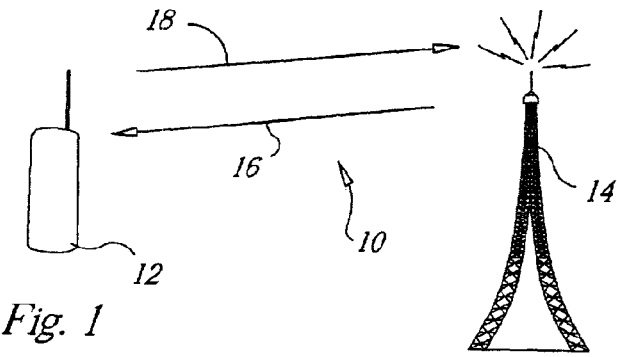
FIG. 1 is a diagram of a communication system constructed in accordance with the principles of the present invention.

Referring now to the drawing figures in which like reference designators refer to like elements, there is shown in FIG. 1 a communication system constructed in accordance with the principles of the present invention and designated generally as 10. Communication system 10 preferably includes one or more wireless devices 12 in communication within one or more communication units such as base stations 14. The signal transmitted from base station 14 to wireless device 12 is generally referred to as forward link 16. The communication signal transmitted from wireless device 12 to base station 14 is generally referred to as reverse link 18.

Communication signals for forward link 16 and reverse link 18 are preferably CDMA spread-spectrum signals and include user data such as encoded voice or other high speed data such as might be transmitted to and from a wireless computer such as a laptop equipped with a CDMA spread-spectrum transmitter and receiver. Standardized protocols for providing wireless high speed data are known.

Wireless device 12 can be any device which includes a wireless communication section (transmitter, receiver, etc.), described below in detail, which receives and transmits wireless communication signals to and from base stations 14 and/or other wireless devices 12. Examples of wireless devices 12 include a computer tower equipped with a wireless transmitter and receiver, a vehicular mounted wireless device, wireless laptop computer, and the like. Base stations 14 are any fixed base station capable of communicating with wireless devices 12, preferably using CDMA spread-spectrum technology. As discussed below in detail, base stations 14 also include a wireless communication section.

In practice, a plurality of base stations 14 are distributed across a region to create a plurality of cells such that each cell facilitates communication with wireless devices 12 in that cell. In order to minimize the effects of interference in each cell, base stations 14 monitor the signal to noise ratio of the signals received on reverse link 18 in order to determine whether to instruct wireless device 12 to increase its transmit power (also referred to as "power up") or decrease transmit power (also referred to "power down") on reverse link 18.

As is described below in detail, the present invention provides a method which allows base station 14 to advantageously determine an accurate estimate of the noise power level received from reverse link 18 and to determine an accurate estimate of the pilot signal power level received from reverse link 18 in order to accurately calculate the signal to noise ratio of the signal received from wireless device 12. Base station 14 uses the estimated signal to noise ratio to determine whether to set the power control bit in forward link 18 to indicate a power up or power down condition to wireless device 12.

Further, the present invention advantageously provides a method which allows base station 14 to evaluate reverse link 18 in a manner which significantly reduces the delay time between the signal to noise ratio estimate determination and the actual insertion of the power control bit in forward link 16. By significantly reducing the delay, wireless device 12 is provided with an accurate power up or power down instruction based on temporal proximity between the calculation time and the portion of the reverse link 18 signal evaluated to determine the signal-to-noise ratio. Reducing the time for signal-to-noise ratio estimation also has the benefit of increasing the maximum functional round trip delay.

Figure 2:
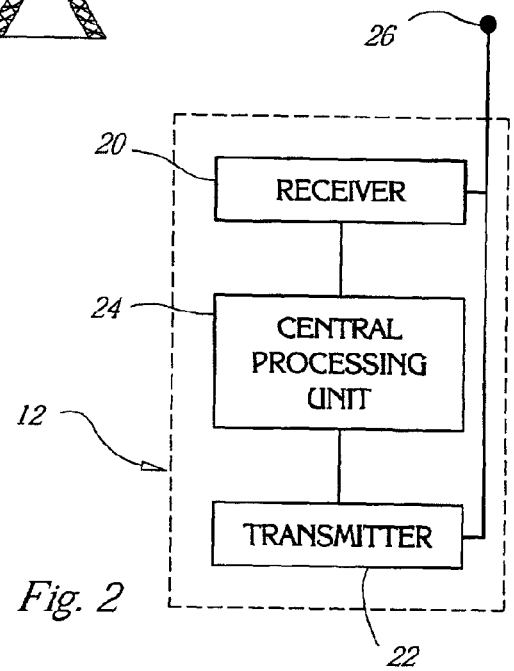
FIG. 2 is a block diagram of the wireless communication section of a device constructed in accordance with the principles of the present invention.

FIG. 2 is a block diagram of the wireless communication section of a device 12 constructed in accordance with the principles of the present invention. As shown in FIG. 2, the wireless communication section of device 12 preferably includes a device receiver 20 and a device transmitter 22, each of which are coupled to and controlled by device central processing unit 24. Device receiver 20 and device transmitter 22 are coupled to antenna 26 for respectively receiving and transmitting signals to and from base station 14 via forward link 16 and reverse link 18. Device receiver 20 is preferably arranged to receive CDMA spread-spectrum signals transmitted by other devices and base stations 14. Device transmitter 22 is likewise preferably arranged to transmit CDMA spread-spectrum signals to other devices and base stations 14 via antenna 26. Device central processing unit 24 is any central processing unit capable of executing the device functions described in detail below.

In accordance with the present invention, device central processing unit 24 is preferably arranged to have access to sufficient memory (not shown) required to store data, buffer, transmit and receive data, and programmatic code to perform its designated, below-described functions. Further, device central processing unit 24 is preferably arranged to cause transmitter 22 to increase or decrease transmit power in accordance with the power control bit received from base station 14 on forward link 16.

Figure 3:
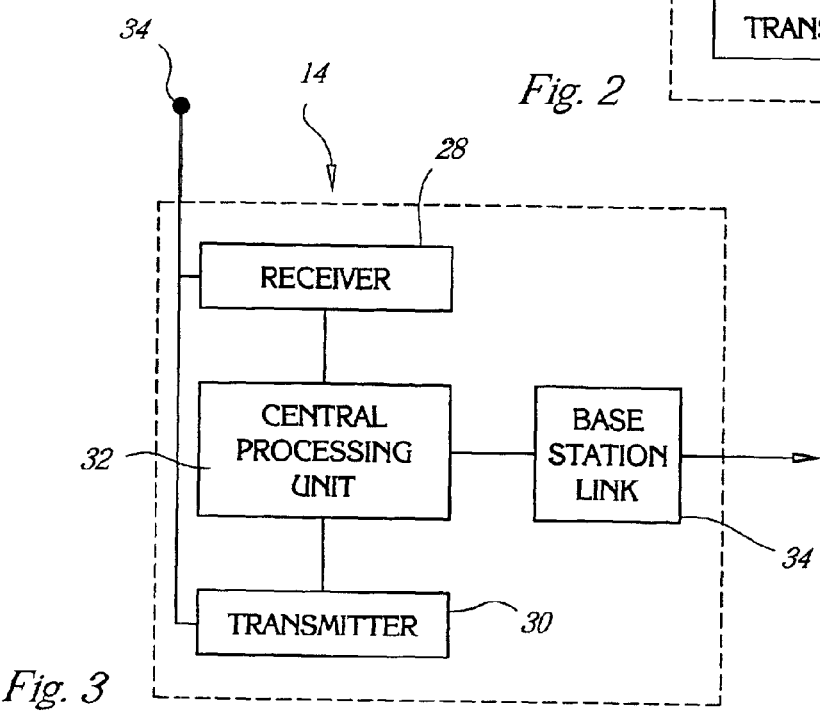
FIG. 3 is a block diagram of a base station constructed in accordance with the principles of the present invention.

FIG. 3 is a block diagram of a base station 14 constructed in accordance with the principles of the present invention. As shown in FIG. 3, base station 14 is preferably comprised of base station receiver 28 and base station transmitter 30, each of which are coupled to and controlled by base station central processing unit 32. Base station 14 also preferably includes base station antenna 34 which is coupled to base station receiver 28 and base station transmitter 30 for receiving signals transmitted by device 12 on reverse link 18 and transmitting signals to device 12 on forward link 16, respectively Base station 14 preferably also includes base station link 34 which provides the necessary interface hardware and/or software to couple base station 14 to other base stations. This interface hardware takes the form of plugs, jacks and electronic circuit elements. The interface software, when executed, provides the drivers and other functions necessary to receive data from other base stations 14 and to transmit data to other base stations 14.

Base station receiver 28 is preferably arranged to receive wireless spread-spectrum CDMA signals from a plurality of devices 12. Similarly, base station transmitter 30 is preferably arranged to generate and transmit spread-spectrum CDMA signals to a plurality of devices 12. As discussed above, base stations 14 transmit power control commands in the form of power control bits to wireless devices 12 via forward link 16.

Base station central processing unit 32 preferably includes or has access to a storage unit which contains the programmatic instructions needed to perform the functions described herein. Further, the storage unit is preferably arranged to store data corresponding to in-progress communication with devices 12, provide buffering of data transmitted and/or received to/from devices 12 and other base stations 14. In general, any central processing unit which provides the described functions of base station 14 can be used.

In the case of both device 12 and base station 14, each of the above-described elements of the respective device is arranged with an internal bus communication structure which facilitates communication among the respective elements. Further, it is contemplated that any combination of the elements of each respective device 12 and base station 14, such as the receivers, transmitters and central processing units, can be provided as a single semi-conductor integrated circuit.

Figure 4:
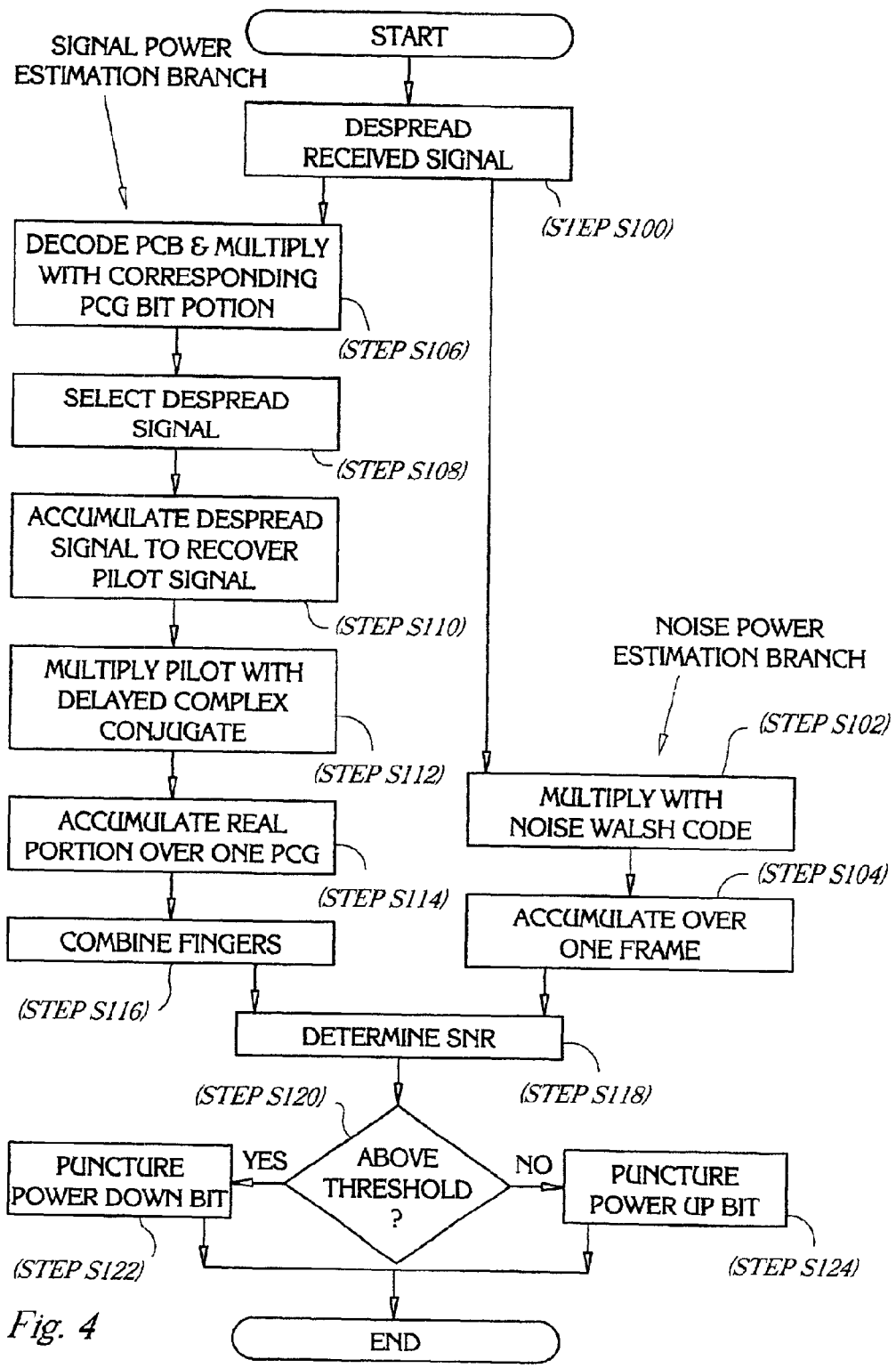
FIG. 4 is a flow chart of the overall operation the system and method of the present invention.

The overall operation of system 10 and the method of the present invention is described with reference to the flow chart in FIG. 4. The following discussion of the operation of the present invention is described with reference to communication between a device 12 and base station 14. The discussion is being made in this manner for the sake of simplicity, it being understood however, that the present invention is operable as described below between multiple devices 12 and one or more base stations 14. Further, unless stated otherwise, the functions described with reference to FIG. 4 are understood to be executed by base station 14 based on an evaluation of the wireless communication signal received from device 12 on reverse link 18.

Initially, the signal received on reverse link 18 by base station 14 is despreaded using the long code assigned to device 12 and the specific short codes (step S100). Techniques for despreading a received CDMA spread-spectrum signal using a device-specific long code and the specific short codes are known.

As noted above, in order to determine the SNR of the received signal, an estimate of the received noise level and an estimate of the received signal level, typically the pilot signal, must be determined. Each of the noise power estimation and the signal power estimation methods are described separately with reference to FIG. 4.

Noise power estimation for the present invention is described first. The despread signal is multiplied by a "noise" Walsh code in order to remove all of the signal in order to leave only a symbol corresponding to the noise level of the received signal (step S102). For example, a "noise" Walsh code constructed in accordance with the principles of the present invention is a 32 bit code in which the first 16 most significant bits are ones and the 16 least significant bits are zeros. This "noise" Walsh code is orthogonal to all Walsh codes, including pilot channel Walsh codes such as those pilot channel Walsh codes known in the art. The "noise" Walsh code constructed in accordance with the principles of the present invention cancels all of the signal transmitted on reverse link 18, thereby advantageously allowing a more accurate noise power estimation than was previously possible.

The multiplied despread signal is accumulated over one received frame to arrive at the noise estimation for the channel being used by the device (step S104). Noise power estimation is described in further detail below.

Next, the overall pilot signal power estimation is explained with reference to FIG. 4. The despread signal corresponding to the power control portion (from step S100) is decoded to obtain the forward power control bit (PCB) embedded in the reverse link 18 signal and the forward power control bit portions multiplied with the decoded power control bits for each Rake finger (step S106). The base station 14 then finds the position of the reverse power control bit which will be embedded in the forward link traffic channel and selects the despread received signal of each Rake finger for a duration of one power control group (step S108).

The despread signal is accumulated over 16 chips to eliminate all data channel signals except the pilot signal (step S110). The decimated pilot signal is multiplied with the complex conjugate of its delayed version (step S112) and the real components of the results are accumulated over one power control group (step S114). This is done for each Rake finger. The output of all Rake fingers are then coherently combined to arrive at the signal power estimate for the received signal (step S116).

Figure 5:
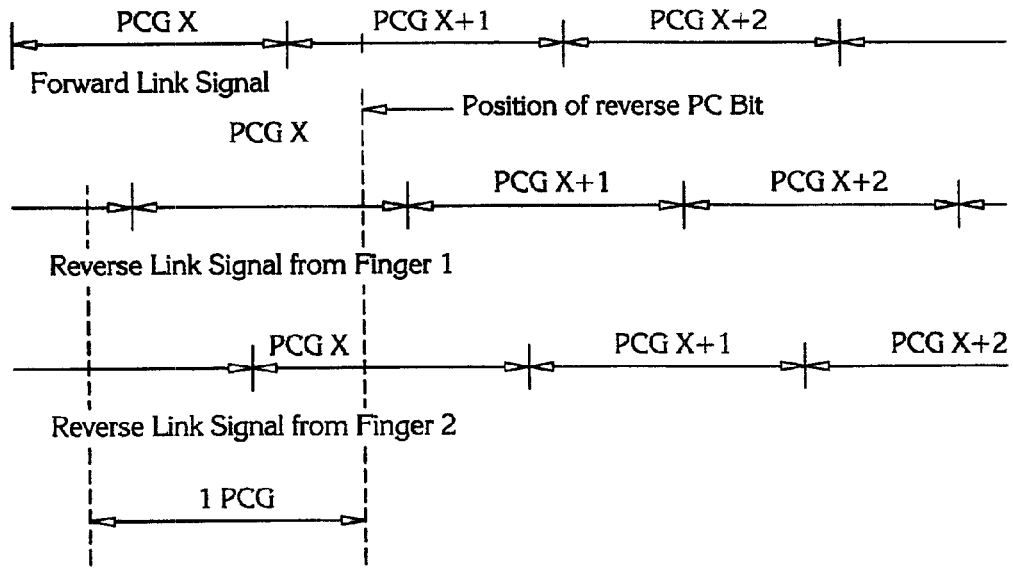
FIG. 5 is a diagram showing an example of timing relationships between the position of the reverse power control bit and the selected duration of the despreaded received signal for each Rake finger.

FIG. 5 is a diagram showing an example of the time and relationship between the position of the reverse power control bit and the selected duration of the despreaded received signal for each Rake finger. FIG. 5 shows the position of the reverse power control (PC) bit for a power control group (PCG) "x".

Referring again to FIG. 4, to determine the SNR (step S118), the resultant estimated pilot signal power is divided by the estimated noise power. Techniques for determining the signal to noise ratio of a received signal once the signal power and noise power levels have been determined are known. However, the present invention advantageously provides methods for determining the received signal power level and received noise power level of a signal which provides better results than heretofore known.

The estimated SNR determined in step S118 is compared to a predetermined threshold set in accordance with the frame error rate measured at the output of receiver 28 (step S120). If the SNR is higher than the predetermined threshold, a power down bit is "punctured", i.e. inserted, into the forward power control bit location of the transmitted forward link 16 signal (step S122). If the SNR is not above the threshold, a power up bit is punctured into the transmitted forward link 16 signal (step S124) indicating to device 12 that device 12 must increase its transmit power level.

The frame error rate refers to the rate at which received frames are found to have errors based on known error checking techniques. Typically, a wireless communication system is designed such that signals transmitted by wireless devices 12 are received by base stations 14 at a power level required to obtain a particular frame error rate. Where higher quality reception is desired, the frame error rate threshold is decreased. As such, wireless devices 12 may be forced to transmit at a higher power level, thereby increasing the overall noise level within a cell which decreases the quantity of devices which can transmit within the cell. In other words, a lower frame error rate lowers the rate at which frame errors occur at the expense of decreasing cell and system capacity.

As such, closed loop power control for the reverse link is accomplished by sending power control commands at the rate of each power control group, for example, 800 Hz, from base station 14 to wireless device 12. The power control bit is generated based on the quality of the reverse link as measured by the received SNR and the measured frame error rate.

Figure 6:
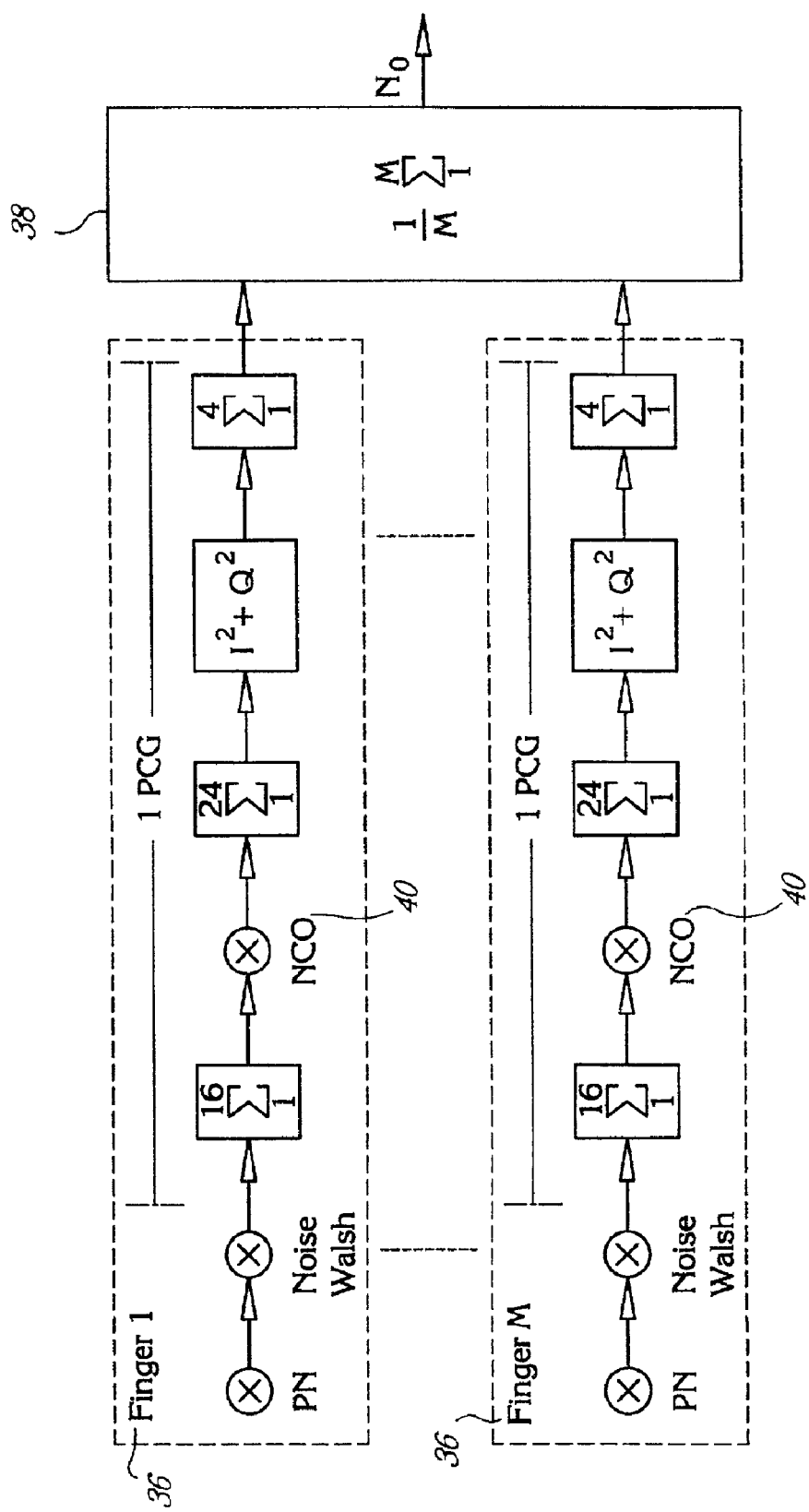
FIG. 6 is a block diagram of a noise estimation technique.

The noise estimation method of the present invention is described in detail with reference to the block diagram in FIG. 6. For each Rake receiver output finger 36 (shown as Fingers 1–M in FIG. 6), the noise estimation method is performed and the results accumulated over one power control group to arrive at the noise power estimation. For each finger, the despread received signal is multiplied by the noise Walsh code and accumulated over 16 chips to remove the associated traffic data signals using data Walsh covers. The accumulated results are multiplied by the output of numerically controlled oscillator 40 and accumulated over another 24 chips to eliminate the pilot channel signal, thereby leaving only the noise power. The results of the in phase and quadrature parts are squared and summed to give a total noise power per finger, accumulated over four quarters of one PCG and input to summer 38.

Figure 7:
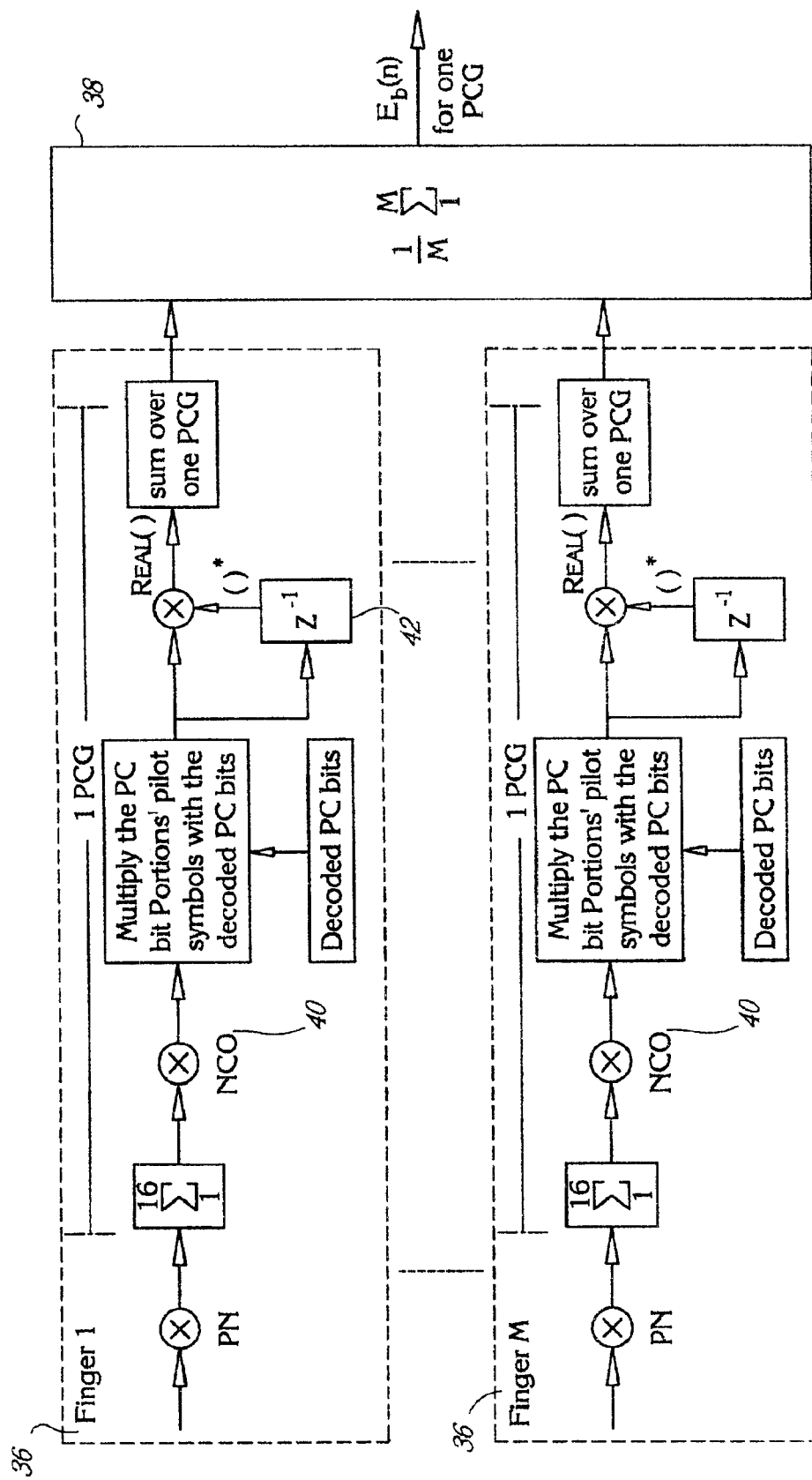
FIG. 7 is a block diagram of a signal estimation technique for a gated pilot signal.
Figure 8:
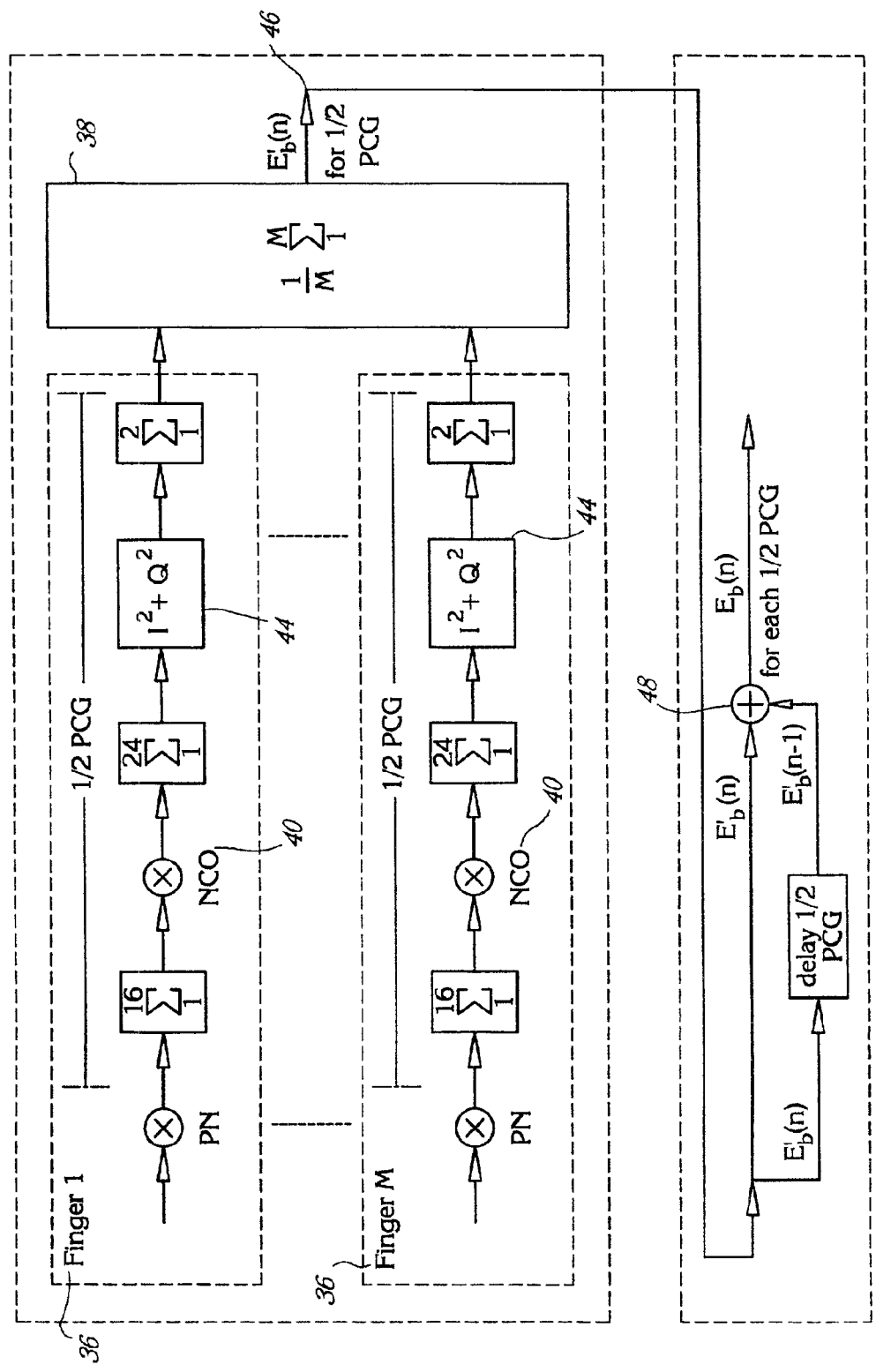
FIG. 8 is a block diagram of a signal estimation technique for a non-gated pilot signal.
Figure 9:
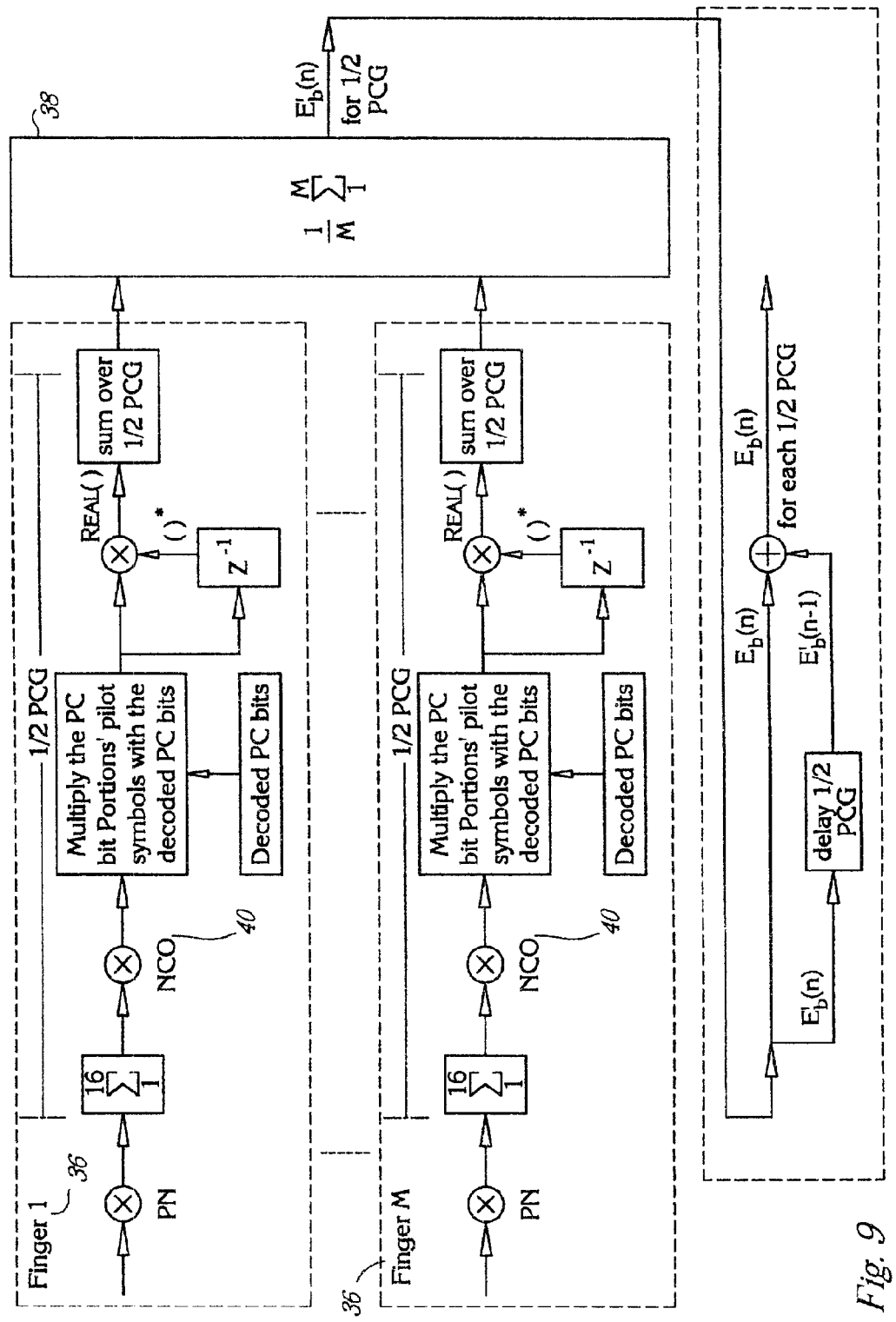
FIG. 9 is a block diagram of an alternate arrangement for estimating the power of a non-gated pilot signal.

Detailed descriptions of pilot signal power estimation methods constructed in accordance with the principles of the present invention are explained with reference to the block diagrams shown in FIGS. 7–9 in which FIG. 7 is a block diagram of a signal estimation technique for a gated pilot signal, FIG. 8 is an estimation method for a non-gated pilot signal, and FIG. 9 is an alternate method for estimating the power of a non-gated pilot signal. Initially, it is noted, as described in FIGS. 7–9, the term "$Z^{-1}$" refers to a one sample delay of the input signal and "$E_b(n)$" refers to the $n^{th}$ estimation of pilot signal strength.

Further, although certain elements in FIGS. 7–9 share the same reference designators, for example, numerically controlled oscillator 40 and summer 38, it is understood that these elements can be implemented as separate elements and processes for noise power estimation and pilot signal power estimation. As with noise power estimation discussed above, each Rake output Finger 36 (shown as Fingers 1–M in FIGS. 7–9), corresponding to each multi-path component are processed for finger signal power estimation and averaged by summer 38. FIG. 7 is a block diagram showing signal power estimation for a gated mode pilot signal. As used herein, the term "gated" refers to a pilot signal which is not continuously transmitted. For some power control groups, the pilot signals are gated on while others are gated off.

Once the Rake output signal is despread using the pseudo noise codes, the despread signal is accumulated over 16 chips to remove the traffic data signals transmitted using data Walsh covers. The decimated pilot signal is then multiplied by the output of numerically controlled oscillator 40 to correct the phase rotation error introduced by the frequency shift. The decoded power control bits recovered from reverse link 18 are multiplied with the pilot symbols corresponding to the power control bit portions to ensure that power control bits having the same sign as the pilot signal are used. This arrangement advantageously allows the resultant portion of the pilot signal to be used for channel estimation.

The resultant pilot symbol and the complex conjugate 42 of its delayed version are multiplied together and their real parts accumulated over one power control group, for example, 1.25 ms in the CDMA2000 standard. The outputs of all fingers 36 are coherently combined and averaged over the total number of Rake fingers to obtain total pilot signal energy $E_b(n)$ for one power control group.

The gated pilot signal power estimation method of the present invention advantageously removes effects of the rapid signal phase changes due to fading from being introduced into the power determination.

A signal power estimation method for a non-gated mode pilot signal is described with reference to the block diagram shown in FIG. 8. Initially, it is noted that conventional techniques for estimating the pilot signal power for a non-gated signal are the same as those employed for gated mode pilot signal power estimation. Gated mode signal power estimation requires knowledge of the signal timing due to the lack of knowledge of whether the other device is transmitting. This arrangement limits non-gated mode power estimation because signal timing knowledge is not required for non-gated mode power estimation. In contrast, the present invention provides a method for enhancing the reliability and accuracy of the power estimation for non-gated mode pilot signals which differs from the above-described method of the present invention for estimating gated mode pilot signal power.

The pilot channel signal power is estimated per each of fingers 36 (Fingers 1–M) by averaging the channel gain estimate over one-half of a power control group. By estimating over one-half of a power control group and updating the estimation every one-half power control group, more frequent estimations can be performed. Further, more accurate estimations can be obtained by estimating more frequently over a smaller portion of the power control group, for example, one-quarter of the power control group. The tradeoff, of course, is further enhanced accuracy at the expense of processing power in base station 14 and implementation complexity with respect to processor design, and software coding.

Once the Rake output signal is despread using the pseudo noise codes, a coherent accumulation over 16 values is formed. The resulting signal is multiplied by the output of numerically controlled oscillator 40 as described above and accumulated 24 times. As a result, the coherent accumulation length is 384 chips. The squared amplitude from processing block 44 is taken over coherent accumulation times, thereby providing the power level within one-half of a power control group for a particular finger. Summer 38 sums and averages the resultant signal powers for all fingers over one-half of a power control group to arrive at an intermediate signal power estimate 46, shown in FIG. 8 as $E'_b(n)$. Intermediate signal power estimate 46 is added to the previous signal energy estimate $E'_b(n-1)$ via adder 48 to arrive at the pilot signal power estimate $E_b(n)$.

FIG. 9 is a block diagram of an alternate arrangement for estimating the power of a non-gated pilot signal. The method shown in FIG. 9 is the same as the method for estimating the power of a gated mode pilot signal, described above with respect to FIG. 7, except that the non-gated signal in FIG. 9 is summed over one-half of a power control group to arrive at $E'_b(n)$ and added to the previous signal energy information via adder 48. In other words, the alternate arrangement shown in FIG. 9 employs the method described with respect to FIG. 7 (gated mode pilot signal) taken over one-half power control group as shown and described with respect to the non-gated mode power estimation method of FIG. 8. The signal power estimation method of the present invention advantageously prevents the effects of the rapid signal phase changes due to fading from being introduced into the power determination.

The pilot signal power estimation techniques described above advantageously facilitate a faster and more accurate power estimation method than those previously known. As such, the estimation methods of the present invention advantageously facilitate high speed wireless communication, for example, wireless communication rates of approximately 100 Kbits/second and faster, by allowing highly accurate, lower delay power control for device transmitter 22.

As described above with respect to steps S120–S124 in FIG. 4, the resultant SNR is compared with a predetermined SNR for a desired frame error rate and an appropriate power up or power down bit is punctured into the power control bit for power control group data transmitted on forward link 16. Although techniques for generally puncturing power control bits into a transmitted power control group signal are known and can be employed in conjunction with the noise power estimation and pilot signal power estimation methods described above with respect to the present invention, the present invention advantageously includes an alternative aspect by which power control estimation can be conducted in a manner which allows greater precision such that wireless high speed data transmission can be supported. In other words, in addition to the above-described methods for power control bit estimation, the present invention advantageously provides a method for reducing power control delay by implementing the most recent power control bit estimate.

Power control bit implementation in accordance with the present invention is described as follows for systems such as a CDMA2000 system and the like. As soon as the estimated reverse power control bit is obtained, it will be punctured into the signal for the forward link 16 for most the recent power control group stored in a transmitter buffer in the base station. For example, in one embodiment, the transmitter buffer may store the signal, including power control group data, for up to three power control groups, which will be updated per power control group. Each time a power control bit estimate is obtained, the estimate is punctured into these three power control groups. The position of power control bit for each power control group is determined by the device's long code. Recall that, as shown in FIGS. 8 and 9, power control bit determination is preferably determined twice per power control group. As a result, the power control delay is greatly reduced.

Power control bit implementation in accordance with the present invention for systems such as IS-95 and the like are described with reference to the block diagram shown in FIG. 10. As noted above, the conventional method for estimating the signal energy uses one power control group signal. However, if the device is too far from the cell site, the device may not be able to send the power control bit on the forward link channel on time.

Figure 10:
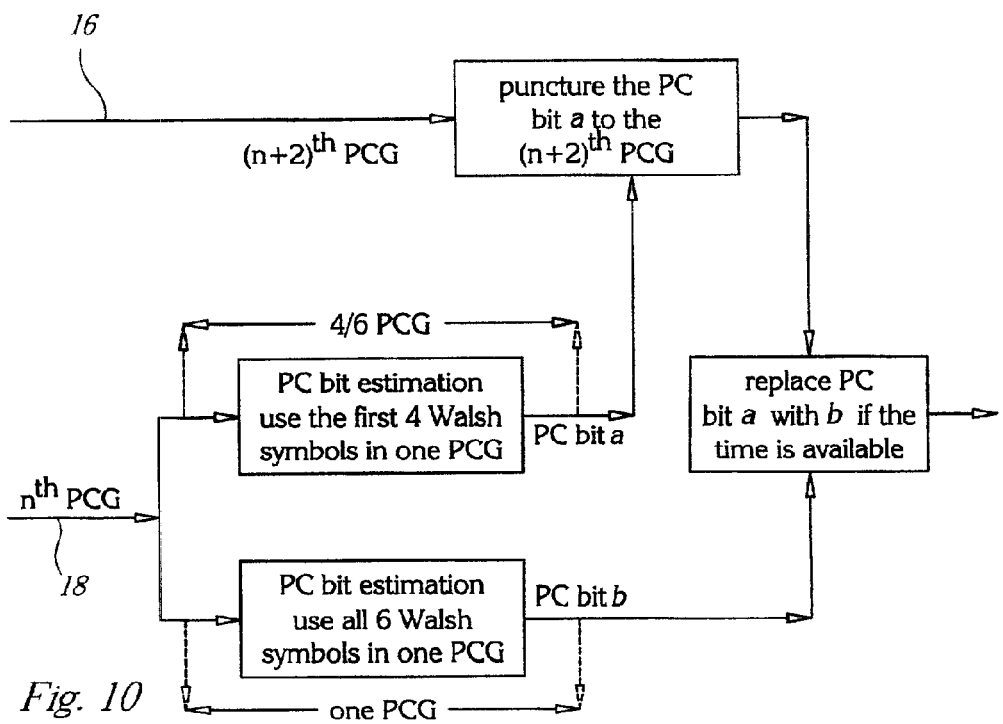
FIG. 10 is a block diagram of a power control bit implementation technique.

Referring to FIG. 10, the present invention determines the power control bit two times per power control group. First, the first four Walsh symbols in each power control group are used to estimate the signal energy and determine the power control bit, shown in FIG. 10 as power control bit "a". Power control bit "a" is punctured into the n+2 power control group of the forward link 16. Next, all six Walsh symbols are used in each power control group to estimate the signal energy and determine the power control bit, shown as power control bit "b" in FIG. 10. If the position of the power control bit in the n+2 power control group of the forward link 16 is after the sixth Walsh symbol of the current reverse link power control group, then bit "a" is replaced with bit "b". This arrangement advantageously allows greater power control accuracy then the previous known methods if the mobile is far from the cell site.

The present invention therefore advantageously provides a method and system for closed loop power control in a wireless system. The present invention employs an aspect which allows the noise level of a received signal to be quickly and accurately estimated and provides a method by which the signal power level can be quickly and accurately measured while still complying with known wireless communication standards such as IS-95 and CDMA2000. Further, the present invention implements these power estimation methods in a manner which advantageously allows a reduction in power control delay by selecting a signal interval for estimation as close as possible to the position of the reverse power control bit imbedded in forward link 16.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for closed loop power control in a wireless communication network, comprising:
   despreading a received signal;
   estimating the signal power of the despread received signal;
   estimating the noise power of the despread received signal, estimating the noise power including:
      multiplying the despread received signal with an orthogonal noise code to cancel the received signal; and
      accumulating the multiplied despread received signal over one frame;
   determining a signal-to-noise ratio of the received signal at least in part by dividing the estimated signal power by the estimated noise power; and
   determining a reverse power control bit based on the determined signal-to-noise ratio.

2. The method according to claim 1, wherein the determined reverse power control bit corresponds to a power down command if the determined signal-to-noise ratio is above a predetermined threshold and wherein the determined reverse power control bit corresponds to a power up command if the determined signal-to-noise ratio is not above the predetermined threshold.

3. The method according to claim 1, wherein the orthogonal noise code is a Walsh code.

4. The method according to claim 3, wherein the Walsh code is a thirty-two bit code in which the most significant sixteen bits are ones and the least significant sixteen bits are zeros.

5. The method according to claim 1, wherein the despread received signal is arranged as a plurality of Rake fingers, and wherein estimating the signal power of the despread received signal is comprised of:
   obtaining a forward power control bit by decoding the despread received signal;
   for each of the plurality of Rake fingers:
      multiplying the decoded forward power control bit with at least one forward power control bit portion;
      determining the position of the reverse power control bit;
      selecting the despread received signal of the corresponding Rake finger for a duration of one power control group;
      accumulating the received despread signal to eliminate all data channel signals except a pilot signal to create a decimated pilot signal;
      multiplying the decimated pilot signal with a complex conjugate of a delayed version of the decimated pilot signal to obtain a multiplied result;
      accumulating a real component of the multiplied result over one power control group to obtain a Rake finger output; and
   determining the signal power estimate by coherently combining and averaging the plurality of Rake finger outputs.

6. The method according to claim 2, further comprising puncturing the determined reverse power control bit into power control group data corresponding to a power control group.

7. The method according to claim 6, wherein puncturing the determined reverse power control bit comprises:
   buffering control group data corresponding to a plurality of power control groups, the determined reverse power control bit being punctured into each of the power control group data corresponding to the plurality of power control groups; and
   updating the buffered control group data each time a reverse power control bit is determined.

8. The method according to claim 7, wherein the reverse power control bit is determined two times per power control group.

9. The method according to claim 6, wherein puncturing the determined reverse power control bit comprises:
   using a first quantity of symbols in each power control group to determine a first signal power estimate;
   determining a first power control bit based on the first signal power estimate;
   puncturing the first power control bit into the n+2 power control group wherein n corresponds to a predetermined power control group;
   using a second quantity of symbols in each power control group to determine a second signal power estimate;
   determining a second power control bit based on the second signal power estimate; and
   replacing the punctured first power control bit with the second power control bit if a power control bit position in the n+2 power control group is after the second quantity of symbols in a current reverse link power control group.

10. The method according to claim 9, wherein the first quantity of symbols corresponds to a first four symbols in a power control group and wherein the second quantity of symbols corresponds to six symbols in the power control group.

11. The method according to claim 10, wherein the symbols are Walsh symbols.

12. The method according to claim 11, wherein the punctured power control bit is determined two times per power control group.

13. The method according to claim 1, wherein the despread received signal is arranged as a plurality of Rake fingers, and wherein estimating the signal power of the despread received signal is comprised of:
   for each of the plurality of Rake fingers:
      coherently accumulating the despread received signal;
      taking a squared amplitude over a time of the coherent accumulation to determine a finger signal power level within one-half of a power control group;
   summing the finger signal power levels for all of the plurality of Rake fingers together over one-half of the power control group to determine an intermediate signal power estimate; and
   adding the intermediate signal power estimate to a previous signal power estimate.

14. The method according to claim 13, wherein the despread received signal includes a non-gated pilot signal.

15. The method according to claim 1, wherein the despread received signal is arranged as a plurality of Rake fingers, and wherein estimating the signal power of the despread received signal is comprised of:
   obtaining a forward power control bit by decoding the despread received signal;
   for each of the plurality of Rake fingers:
      multiplying the decoded forward power control bit with at least one forward power control bit portion;
      determining the position of the reverse power control bit;
      selecting the despread received signal of the corresponding Rake finger for a duration of one-half power control group;
      accumulating the received despread signal to eliminate all data channel signals except a pilot signal to create a decimated pilot signal;
      multiplying the decimated pilot signal with a complex conjugate of a delayed version of the decimated pilot signal to obtain a multiplied result;
      accumulating a real component of the multiplied result over one-half power control group to obtain a finger signal power level;
   summing the finger signal power levels for all of the plurality of Rake fingers together over one-half of the power control group to determine an intermediate signal power estimate; and
   adding the intermediate signal power estimate to a previous signal power estimate.

16. A method for estimating a power level for a despread wireless communication signal having a non-gated pilot signal, the despread received signal being arranged as a plurality of Rake fingers, the method comprised of:
   obtaining a forward power control bit by decoding the despread received signal;
   for each of the plurality of Rake fingers:
      multiplying the decoded forward power control bit with at least one forward power control bit portion;
      determining the position of the reverse power control bit;

selecting the despread received signal of the corresponding Rake finger for a duration of one power control group;

accumulating the received despread signal to eliminate all data channel signals except a pilot signal to create a decimated pilot signal;

multiplying the decimated pilot signal with a complex conjugate of a delayed version of the decimated pilot signal to obtain a multiplied result;

accumulating a real component of the multiplied result over one power control group to obtain a Rake finger output; and determining the signal power estimate by coherently combining and averaging the plurality of Rake finger outputs.

17. A method for estimating a power level for a despread wireless communication signal having a gated pilot signal, the despread received signal being arranged as a plurality of Rake fingers, the method comprised of:

for each of the plurality of Rake fingers:
coherently accumulating the despread received signal;
taking a squared amplitude over a time of the coherent accumulation to determine a finger signal power level within one-half of a power control group;

summing the finger signal power levels for all of the plurality of Rake fingers together over one-half of the power control group to determine an intermediate signal power estimate; and adding the intermediate signal power estimate to a previous signal power estimate.

18. A system for closed loop power control in a wireless communication network, comprising:

a communication unit having:
a receiver, the receiver receiving a first signal;
a central processing unit, the central processing unit in operative communication with the receiver and executing functions including:
despreading the received first signal;
estimating the signal power of the despread received first signal;
estimating the noise power of the despread received first signal, estimating the noise power including:
multiplying the despread received signal with an orthogonal noise code to cancel the received first signal; and
accumulating the multiplied despread received first signal over one frame;
determining a signal-to-noise ratio of the received first signal at least in part by dividing the estimated signal power by the estimated noise power; and
determining a reverse power control bit based on the determined signal-to-noise ratio.

19. The system according to claim 18, wherein the central processing unit further performs the function of punching the determined reverse power control bit into a second signal.

20. The system according to claim 19, further including a device, wherein the communication unit further includes a transmitter in operative communication with the central processing unit, the transmitter transmitting the second signal to the device using the wireless communication network.

21. The system according to claim 18, wherein the determined reverse power control bit corresponds to a power down command if the determined signal-to-noise ratio is above a predetermined threshold and wherein the determined reverse power control bit corresponds to a power up command if the determined signal-to-noise ratio is not above the predetermined threshold.

22. The system according to claim 18, wherein the orthogonal noise code is a Walsh code.

23. The system according to claim 22, wherein the Walsh code is a thirty-two bit code in which the most significant sixteen bits are ones and the least significant sixteen bits are zeros.

24. The system according to claim 18, wherein the despread received first signal is arranged as a plurality of Rake fingers, and wherein estimating the signal power of the despread received first signal is comprised of:

obtaining a forward power control bit by decoding the despread received first signal;

for each of the plurality of Rake fingers:
multiplying the decoded forward power control bit with at least one forward power control bit portion;
determining the position of the reverse power control bit;
selecting the despread received signal of the corresponding Rake finger for a duration of one power control group;
accumulating the received despread signal to eliminate all data channel signals except a pilot signal to create a decimated pilot signal;
multiplying the decimated pilot signal with a complex conjugate of a delayed version of the decimated pilot signal to obtain a multiplied result;
accumulating a real component of the multiplied result over one power control group to obtain a Rake finger output; and determining the signal power estimate by coherently combining and averaging the plurality of Rake finger outputs.

25. The system according to claim 21, wherein the central processing unit further executes the function of puncturing the determined reverse power control bit into power control group data corresponding to a power control group.

26. The system according to claim 25, wherein puncturing the determined reverse power control bit comprises:

buffering control group data corresponding to a plurality of power control groups, the determined reverse power control bit being punctured into each of the power control group data corresponding to the plurality of power control groups; and updating the buffered control group data each time a reverse power control bit is determined.

27. The system according to claim 26, wherein the reverse power control bit is determined two times per power control group.

28. The system according to claim 25, wherein puncturing the determined reverse power control bit comprises:

using a first quantity of symbols in each power control group to determine a first signal power estimate;

determining a first power control bit based on the first signal power estimate;

puncturing the first power control bit into the n+2 power control group wherein n corresponds to a predetermined power control group;

using a second quantity of symbols in each power control group to determine a second signal power estimate;

determining a second power control bit based on the second signal power estimate; and replacing the punctured first power control bit with the second power control bit if a power control bit position in the n+2 power control group is after the second quantity of symbols in a current reverse link power control group.

29. The system according to claim 28, wherein the first quantity of symbols corresponds to a first four symbols in a power control group and wherein the second quantity of symbols corresponds to six symbols in the power control group.

30. The system according to claim 29, wherein the symbols are Walsh symbols.

31. The system according to claim 30, wherein the punctured power control bit is determined two times per power control group.

32. The system according to claim 18, wherein the despread received first signal is arranged as a plurality of Rake fingers, and wherein estimating the signal power of the despread received first signal is comprised of:

for each of the plurality of Rake fingers:
coherently accumulating the despread received first signal;
taking a squared amplitude over a time of the coherent accumulation to determine a finger signal power level within one-half of a power control group;

summing the finger signal power levels for all of the plurality of Rake fingers together over one-half of the power control group to determine an intermediate signal power estimate; and adding the intermediate signal power estimate to a previous signal power estimate.

33. The system according to claim 32, wherein the despread received first signal includes a non-gated pilot signal.

34. The system according to claim 18, wherein the despread received first signal is arranged as a plurality of Rake fingers, and wherein estimating the signal power of the despread received first signal is comprised of:

obtaining a forward power control bit by decoding the despread received first signal;

for each of the plurality of Rake fingers:
multiplying the decoded forward power control bit with at least one forward power control bit portion;
determining the position of the reverse power control bit;
selecting the despread received first signal of the corresponding Rake finger for a duration of one-half power control group;
accumulating the received despread first signal to eliminate all data channel signals except a pilot signal to create a decimated pilot signal;
multiplying the decimated pilot signal with a complex conjugate of a delayed version of the decimated pilot signal to obtain a multiplied result;
accumulating a real component of the multiplied result over one-half power control group to obtain a finger signal power level;

summing the finger signal power levels for all of the plurality of Rake fingers together over one-half of the power control group to determine an intermediate signal power estimate; and adding the intermediate signal power estimate to a previous signal power estimate.

* * * * *